United States Patent [19]
Ishibashi

[11] Patent Number: 6,122,007
[45] Date of Patent: Sep. 19, 2000

[54] IMAGE PICKUP SYSTEM HAVING FIRST AND SECOND IMAGING MODES

[75] Inventor: Norio Ishibashi, Kanagawa, Japan

[73] Assignee: Sony Corporation, Tokyo, Japan

[21] Appl. No.: 08/814,477

[22] Filed: Mar. 10, 1997

[30] Foreign Application Priority Data

Mar. 29, 1996 [JP] Japan ................................ 8-103280

[51] Int. Cl.[7] ............................................ H04N 5/76
[52] U.S. Cl. ...................................... 348/231; 348/222
[58] Field of Search ................................ 348/231, 232, 348/233, 207, 222, 239, 230, 552, 317

[56] References Cited

U.S. PATENT DOCUMENTS

| | | | |
|---|---|---|---|
| 5,070,406 | 12/1991 | Kinoshita .............................. | 348/222 |
| 5,264,944 | 11/1993 | Takemura ............................. | 348/224 |
| 5,396,290 | 3/1995 | Kannegundla et al. ............... | 348/322 |
| 5,477,264 | 12/1995 | Sarbadhikari et al. ............... | 348/222 |
| 5,493,335 | 2/1996 | Parulski et al. ....................... | 348/233 |
| 5,828,406 | 10/1998 | Parulski et al. ....................... | 348/220 |

FOREIGN PATENT DOCUMENTS

7-284052 10/1995 Japan .
8-9391 1/1996 Japan .

*Primary Examiner*—Wendy Garber
*Assistant Examiner*—Aung S. Moe
*Attorney, Agent, or Firm*—Frommer Lawrence & Haug, LLP.; William S. Frommer; Dennis M. Smid

[57] ABSTRACT

A CCD image pickup device 21 has all-pixel read mode and a double speed read mode. The number of lines in the vertical direction is ½ of that of the all-pixel read mode. In the double speed read mode, the number of pixels in the horizontal direction is halved by a VRAM write controller 33. A VRAM 34 stores a picture of which pixels have been ¼ thinned out. The stored picture is output to a monitor 4. The monitor 4 displays a live picture on real time basis. In the all-pixel read mode, a picture is stored in a frame memory 40. The memory picture is ¼ thinned out. The resultant picture is output as a preview picture to the monitor 4 through the VRAM 34. Background picture data is stored in a background picture memory 44 through a SPC 42. The mix circuit 45 composites the background picture received from the background picture memory 44 and the picture received from the VRAM 34 and outputs the composite picture to the monitor 4.

4 Claims, 11 Drawing Sheets

IMAGE PICKUP SYSTEM HAVING FIRST AND SECOND IMAGING MODES

BACKGROUND OF THE INVENTION

1. Field of the Invention

The present invention relates to an electronic image pickup apparatus for photographing a still picture.

2. Description of the Related Art

Figure 12:
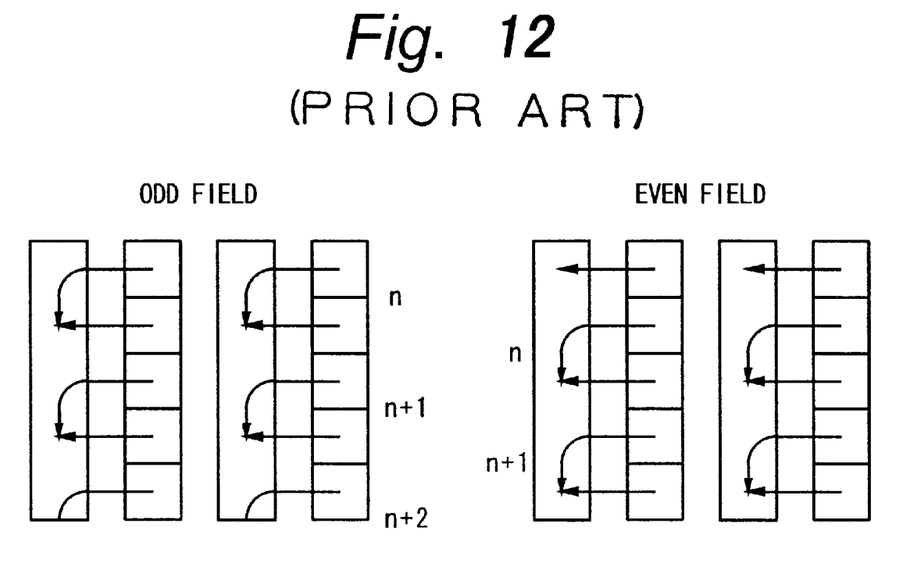
FIG. 12 is a schematic diagram for explaining a conventional image pickup device.
Figure 13:
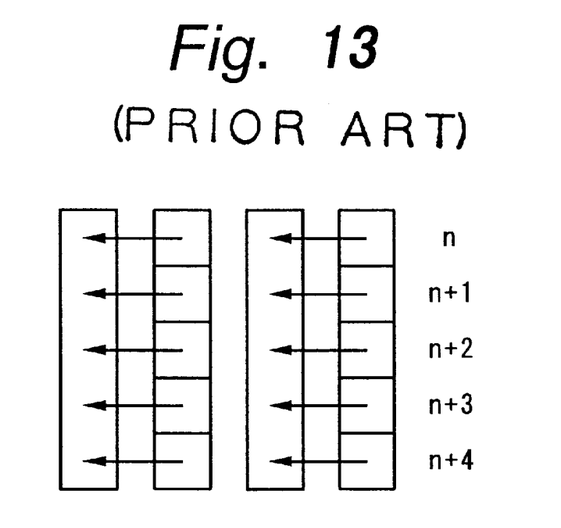
FIG. 13 is a schematic diagram for explaining a conventional image pickup device.

As a solid state image pickup device suitable for an electronic still camera, for example, a CCD image pickup device, a square-lattice all-pixel reading type device has been proposed. In the square-lattice type image pickup device, the vertical intervals of adjacent pixels accord with the horizontal intervals thereof. For example, the square-lattice type image pickup device is used for matching a picture signal with a monitor of a personal computer. Since a CCD image pickup device for use with a conventional video camera or the like generates an interlaced output signal, as shown in FIG. 12, the device stores the signal for $\frac{1}{60}$ seconds (one field), reads two pixels, mixes two pixels read by a vertical transferring CCD, and shifts the vertical positions of pixels to be mixed depending on whether the current field is an odd field or an even field so as to accomplish the interlace scanning operation.

With the CCD image pickup device that reads a signal corresponding to the NTSC system or the PAL system, while the user is watching a picture read from the CCD image pickup device and a background picture, a composite picture thereof is created corresponding to a key (chroma) signal. The composite picture displayed on the monitor is printed by a printer. Since picture data corresponding to the NTSC system or the PAL system is printed, the picture quality including resolution is limited.

Since the above-described CCD image pickup device stores a signal for $\frac{1}{60}$ seconds, it can properly photograph a moving picture in comparison with a frame storing system for storing a signal for $\frac{1}{30}$ seconds. However, the vertical resolution of the CCD image pickup device is inferior to that of the frame storing system. Thus, the CCD image pickup device is not suitable for an image pickup device for use with an electronic still camera. To solve such a problem, an all-pixel reading system for storing a signal for $\frac{1}{30}$ seconds and reading all pixels has been proposed. According to this system, although the vertical resolution can be prevented from deteriorating, to output a captured picture signal from the image pickup device, when the number of pixels and the read clock are the same, the device according to such a system requires twice that of the above-described image pickup device for the video camera. More reality, in the system, a captured picture signal is generated at intervals of $\frac{1}{30}$ seconds.

The above-described read time is applicable for an image pickup device with effective pixels of 480 (vertical)×640 (horizontal). Thus, a professional type device requires a higher resolution than such a home-use image pickup device. For example, a high resolution CCD image pickup device with effective pixels of 1024×1280 is used. In this case, the read time becomes long. When all pixels of one picture are read, it takes for example $\frac{1}{12}$ seconds. With such a picture, as a method for improving the picture quality of the composite picture, a computer can be used. In this method, a picture is captured and processed by the computer so as to create a composite picture.

With the computer, the picture quality of the composite picture can be improved. However, in this method, to check the angle of view and so forth, each captured picture should be transferred from the electronic still camera to the computer so as to check the composite picture of the captured picture and the background picture. With the high resolution CCD image pickup device, since the data amount is very large, it takes a long time to transfer data.

OBJECTS AND SUMMARY OF THE INVENTION

Therefore, an object of the present invention is to provide a digital electronic image pickup apparatus for allowing the angle of view and so forth to be quickly adjusted and checked in creating a composite picture and for creating the composite picture in a high quality and a method thereof.

A first aspect of the present invention is an image pickup apparatus, comprising a image pickup means having a first imaging mode and a second imaging mode, in the first imaging mode, a first captured picture signal, in the second imaging mode a second captured picture signal being output, the number of pixels of the first captured picture signal being larger than the number of pixels of the second captured picture signal, a first storing means having a storage capacity for storing the first captured picture signal, a second storing means to which an external input picture signal supplied from outside the apparatus is written, the number of pixels of the external input picture signal being nearly the same as the number of pixels of the second captured picture signal, a mixing means for mixing a captured picture signal received from the image pickup means in the second imaging mode and the external input picture signal read from the second storing means, a displaying means for displaying a picture corresponding to a picture signal received from the mixing means, the number of pixels of the picture signal is the same as that of the second captured picture signal, a commanding means for causing a still picture to be captured, and a controlling means for controlling the image pickup means, the first storing means, and the second storing means, wherein the controlling means causes the image pickup means to operate in the first imaging mode so as to cause the displaying means to display the picture received from the mixing means, and thereby causes the mode of the image pickup means to be switched to the second imaging mode, and causes the first storing means to record the first captured picture signal when the commanding means causes the still picture to be captured.

A second aspect of the present invention is an image pickup system, comprising an image pickup apparatus including, a image pickup means having a first imaging mode and a second imaging mode, in the first imaging mode, a first captured picture signal, in the second imaging mode a second captured picture signal being output, the number of pixels of the first captured picture signal being larger than the number of pixels of the second captured picture signal, a first storing means having a storage capacity for storing the first captured picture signal, a second storing means to which an external input picture signal supplied from outside the apparatus is written, the number of pixels of the external input picture signal being nearly the same as the number of pixels of the second captured picture signal, a mixing means for mixing a captured picture signal received from the image pickup means in the second imaging mode and the external input picture signal read from the second storing means, a displaying means for displaying a picture corresponding to a picture signal received from the mixing means, the number of pixels of the picture signal is the same as that of the second captured picture signal, a commanding means for causing a still picture to be captured, and a controlling means for controlling the image pickup means, the first storing means, and the second storing means, wherein the controlling means causes the image pickup means to operate in the first imaging mode so as to cause the displaying means to display the picture received from the mixing means, and thereby causes the mode of the image pickup means to be switched to the second imaging mode, and causes the first storing means to record the first captured picture signal when the commanding means causes the still picture to be captured, and a controlling unit including a storing means for storing a first picture signal, the number of pixels of the first picture signal being the same as that of the first captured picture signal, a thin-out means for thinning out pixels of the first picture signal as a second picture signal, and a transferring means for transferring the second picture signal as the external input picture signal to the image pickup apparatus.

A third aspect of the present invention is a still picture image pickup method, comprising the steps of storing an external input picture signal supplied from an external unit to a second storing means, causing a image pickup means having a first imaging mode and a second imaging mode to perform a image pickup operation in the second imaging mode, in the first imaging mode, a first captured picture signal being output, in the second imaging mode, a second captured picture signal being output, the number of pixels of the first captured picture signal is larger than that of the second captured picture signal, mixing the second captured picture signal captured in the second imaging mode with the external input picture signal, causing a displaying means corresponding to the number of pixels of the second picture signal to display the mixed signal, causing the image pickup means to switch the mode to the second imaging mode and the first storing means to store the first captured picture signal while the displaying means being displaying a picture and a still picture capture command is supplied, and transferring the first captured picture signal to the external unit.

These and other objects, features and advantages of the present invention will become more apparent in light of the following detailed description of a best mode embodiment thereof, as illustrated in the accompanying drawings.

DETAILED DESCRIPTION OF THE PREFERRED EMBODIMENTS

Figure 1:
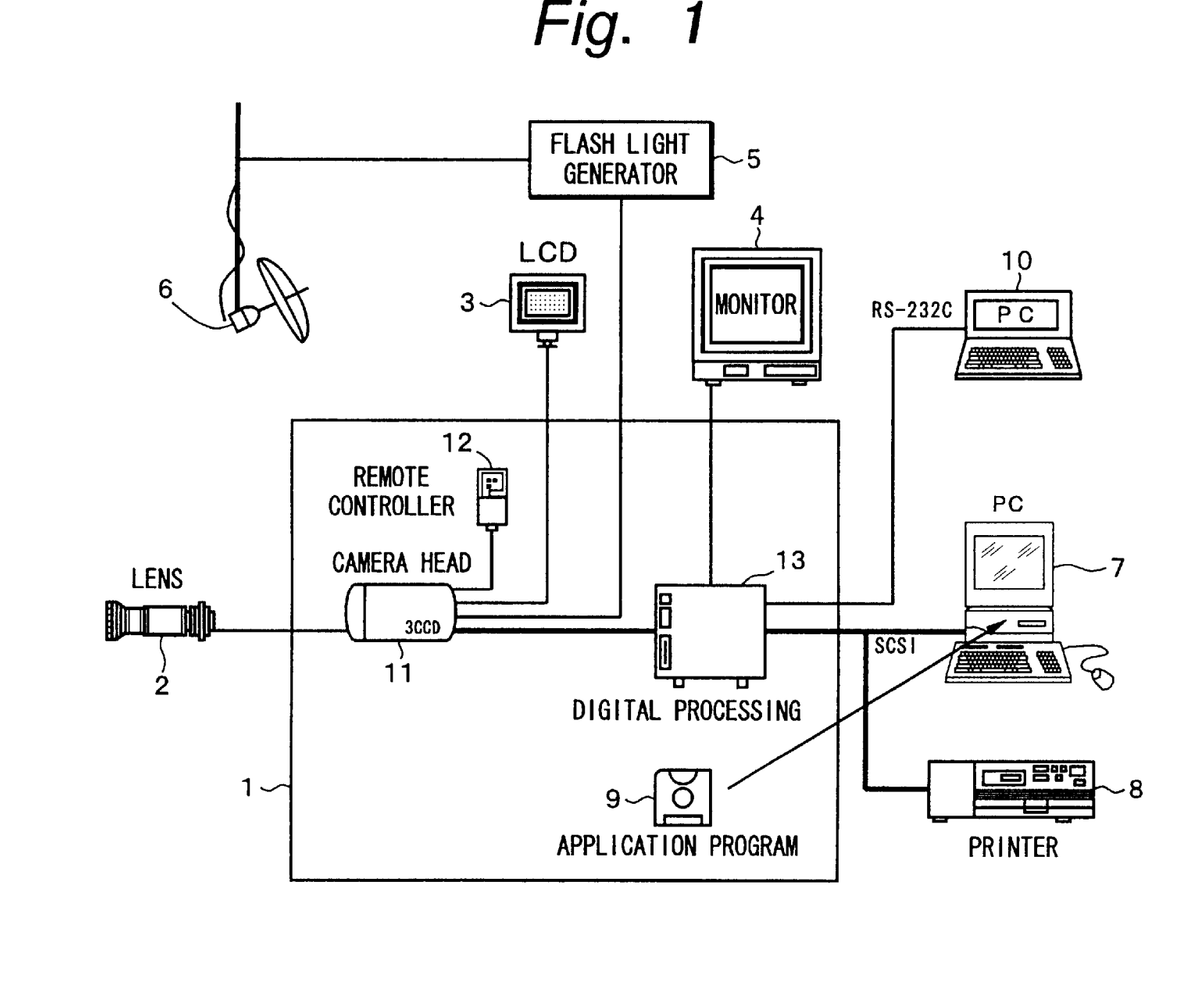
FIG. 1 is a schematic diagram showing a structure of a system according to the present invention.

Next, with reference to the accompanying drawings, an embodiment of the present invention will be described. FIG. 1 shows a structure of the system according to the present invention. Reference numeral 1 is a digital electronic still camera. A zoom lens 2 is mounted on the digital electronic still camera 1. Picture data (captured picture signal) is displayed on a view finder type liquid crystal display 3 and a live picture/memory picture preview type NTSC/PAL system monitor 4 through the zoom lens 2. When picture data is captured, the electronic still camera 1 sends a control signal to the flash light generator 5 so as to generate flash light.

The flash light generator 5 generates flash light corresponding to the control signal received from the electronic still camera 1. The captured picture data is supplied to a picture processing unit through an interface. For example, picture data received from the digital electronic still camera 1 is supplied to a personal computer 7 and/or a digital printer 8 through a SCSI interface. The personal computer 7 composites picture data and background data supplied corresponding to an application program. The captured picture data and the processed picture data can be printed by the digital printer 8. The background data selected by the personal computer 7 is supplied to the digital still camera 1. This system is controlled by a personal computer 10 through an RS-232C interface.

Figure 2:
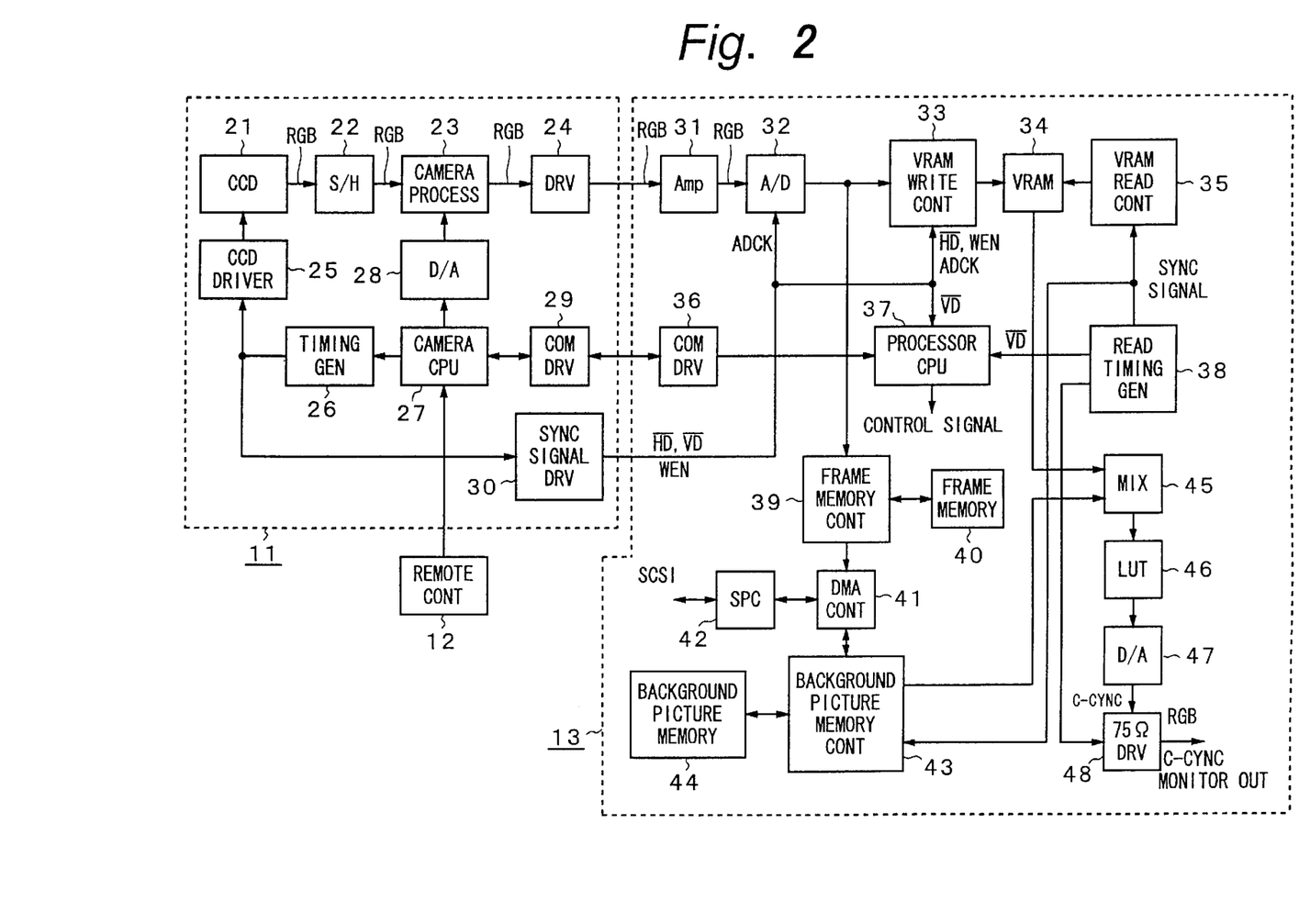
FIG. 2 is a block diagram showing a digital electronic still camera according to an embodiment of the present invention.

The digital electronic still camera 1 is composed of a camera head portion 11, a remote controller 12, and a digital processor portion 13. FIG. 2 shows the overall structure of the digital electronic still camera 1 according to the present invention. Reference numeral 21 is a three-plate type image pickup device having three high resolution (for example, 124×1280 pixel) CCD image pickup devices corresponding to three primary colors R, G, and B. As will be described later, the CCD image pickup device 21 has two switchable modes that are a standard read mode (first imaging mode) and a double speed read mode (second imaging mode). In the first imaging mode, electric charges of all pixels are independently read, not mixed. In the second imaging mode, electric charges for every two lines are added and output. Light of an object is entered into the CCD image pickup device 21 through the zoom lens 2.

An output signal (RGB) of the CCD pickup device 21 is supplied to a sample hole circuit 22. In the standard read mode, it takes for example 1/12 seconds to read one picture. In the double speed read mode, it takes 1/24 seconds to read one picture. The sample hold circuit 22 is composed of a correlated double sampling circuit that removes noise, shapes waveform, and compensates lost pixels. An output signal of the sample hold circuit 22 is supplied to a camera process circuit 23.

The camera process circuit 23 uses the normal gain in the standard read mode. On the other hand, the camera process circuit 23 uses the half gain in the double speed read mode. The gain is adjusted corresponding to a signal received from the remote controller 12.

The camera process circuit 23 adjusts the color balance of RGB, the white balance, and the black balance. In addition, the camera process circuit 23 analogously performs γ compensation and preknee process. The camera process circuit 23 is controlled corresponding to control data received from a camera CPU 27 through a D/A converting circuit 28. An output signal (analog RGB signal) of the camera process circuit 23 is supplied to a digital processor 13 through a driver 24.

A command is supplied from a remote controller 12 to the camera CPU 27. The camera CPU 27 outputs control signals to the D/A converter 28, a timing generating circuit 26, and a communication driver 29. The remote controller 12 has a grab key, a live picture/memory picture switch key, a composite picture key, a lens control key, and so forth. The grab key is used to capture picture data from the CCD image pickup device 21 to a frame memory 40 in the standard read mode. The live picture/memory picture switch key is used to select one of a live picture and a memory picture as a picture displayed on the monitor 4. The live picture is a picture photographed by the CCD pickup device 21 and ¼ averaged. The memory picture is a picture of which picture data written to the frame memory 40 is ¼ averaged. A function for displaying the memory picture on the monitor 4 is referred to a preview function. The composite picture key is used to display a composite picture on the monitor 4. The composite picture is a picture of which live/memory picture and background picture are mixed corresponding to a mixing ratio designated by the CPU 37.

The remote controller 12 sends a control signal to the camera CPU 27. The timing generating circuit 26 generates timings of a horizontal synchronous signal (−HD), a vertical synchronous signal (−VD), synchronous signals (WEN) and (−SG), and so forth. A sign "−" that is followed by each signal represents that the signal operates as active low.

The generated signals are supplied from the timing generating circuit 26 to a CCD driver 25 and a synchronous signal driver 30. The CCD driver 25 drives the CCD image pickup device 21 corresponding to the supplied signals. As an example, the signal WEN is used as a start signal for causing CCD image pickup device 21 to output a picture signal. The synchronous signal driver 30 supplies the signal −HD, the signal −VD, and the signal WEN to the digital processor portion 13.

The camera head portion 11 and the digital processor portion 13 are connected through the driver 24, the communication driver 29, and a synchronous signal driver 30. An analog RGB signal that is output from the driver 24 is supplied to an amplifier 31 of the digital processor portion 13. The camera CPU 27 communicates with a processor CPU 37 through the communication drivers 29 and 36. The synchronous signals received from the synchronous signal driver 30 are supplied to an A/D converter circuit 32, a VRAM write controller 33, and a processor CPU 37 of the digital processor portion 13.

The amplifier 31 shapes a waveform of the analog RGB signal received from the camera head portion 11. The A/D converting circuit 32 digitizes the RGB signal. The A/D converting circuit 32 converts the RGB signal as an analog signal into a digital signal in synchronization with a clock signal ADCK corresponding to the low signal level of the signal −HD, the signal −VD and the signal WEN.

Figure 14:
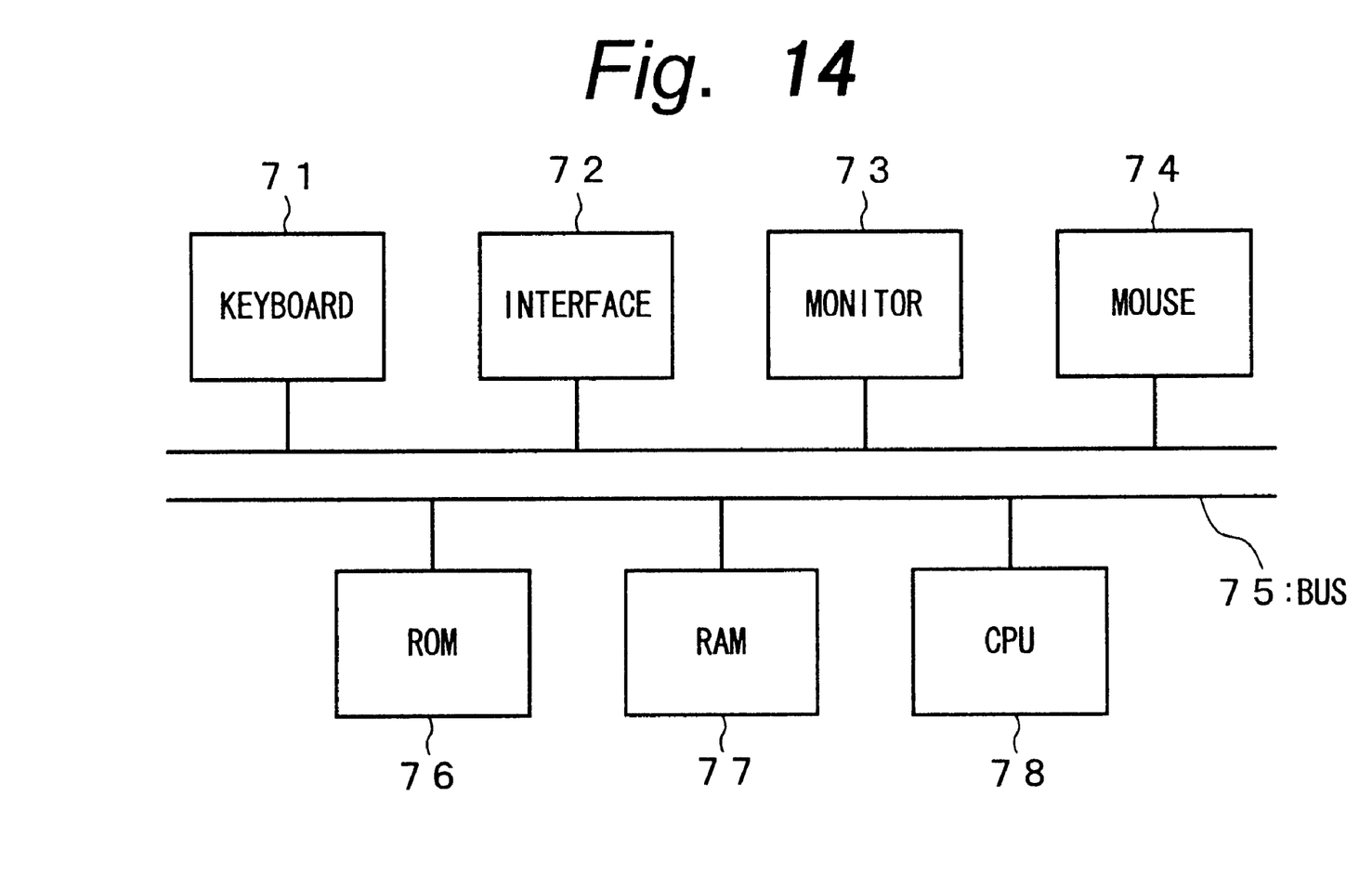
FIG. 14 is a block diagram showing a personal computer according to the present invention.

In addition, the personal computer 7 has a structure as shown in FIG. 14. Referring to FIG. 14, the personal computer 14 comprises a keyboard 71, an interface 72 that is a SCSI interface, a monitor 73, a mouse 74, a bus 75, a ROM 76, a RAM 77, and a CPU 78. A plurality of background pictures are stored in storing means such as a ROM 76 and a RAM 77.

In the embodiment, normally, since the CCD image pickup device 21 operates in the double speed read mode, the operation of the device in the double speed read mode will be described. An RGB signal (picture data) that has been digitized by the A/D converter 32 is supplied to the VRAM write controller 33 and a frame memory controller 39. The VRAM write controller 33 performs a horizontal averaging process for the received picture data so that the number of pixels thereof is halved. When a write control signal for a real time monitor VRAM 34 is generated, picture data of which pixels have been thinned out in the horizontal direction is supplied to the VRAM 34.

The picture data written to the VRAM 34 is 5 picture data in the double speed read mode (namely, the picture data is averaged in the vertical direction) and read from the CCD image pickup device 21. The VRAM write controller 33 averages pixels in the horizontal direction of the picture data. In reality, the averaging process in the horizontal and vertical directions causes every 2×2 pixels to be ¼ averaged into one pixel. The resultant pixels are written to the VRAM 34. Data is read from the VRAM 34 corresponding to a NTSC/PAL synchronous signal. In other words, the NTSC/PAL synchronous signal received from the read timing generating circuit 38 is supplied to a VRAM read controller 35 and a background picture memory controller 43. The VRAM read controller 35 reads the picture data from the VRAM 34 corresponding to the synchronous signal and supplies the picture signal to a mix circuit 45.

On the other hand, background picture data selected from a plurality of background pictures is ¼ averaged by a software process of the personal computer 7. The resultant background picture data is supplied to a SCSI protocol controller 42 through a SCSI interface. The background picture data sent to the SCSI protocol controller 42 is supplied to a background picture memory 44 through a DMA (Direct Memory Access) controller 41 and the background picture memory controller 43. In other words, the background picture data supplied from the SCSI interface is written to the background picture memory 44 at high speed. The background picture memory 44 stores the background picture data in the same size as the picture data stored in the VRAM 34 (namely, ¼ of all pixels read from the CCD image pickup device 21). The background picture data written to the background picture memory 44 is supplied to the mix circuit 45 corresponding to the synchronous signal received from the read timing generating circuit 38 (namely, in synchronization with the VRAM 34). The mix circuit 45 composites the supplied picture data and background picture data with any mixing ratio designated by the processor CPU 37 and supplies the resultant composite picture data to a lookup table 46.

The lookup table 46 compensates the supplied composite picture data. The lookup table 46 is used to accord colors of the computer monitor with colors of the electronic still camera 1. A D/A converting circuit 47 converts the compensated composite picture data into an analog signal. A 75 ohm driver 48 outputs the composite picture data and C-SYNC (composite synchronous signal) received from the read timing generating circuit 38.

In other words, the picture data stored in the VRAM 34 and/or the background picture stored in the background picture memory 44 is output from the 75 ohm driver 48 and displayed on the monitor 4. In addition, when a background picture is not composited, only a picture stored in the VRAM 34 is displayed on the monitor 4.

Next, a picture data capturing process will be described. In this process, after the user presses the grab key of the remote controller 12, the mode is changed to the standard read mode. Digitized picture data received from the A/D converting circuit 32 is supplied to the frame memory controller 39. The frame memory controller 39 supplies the received picture data to the frame memory 40. The frame memory 40 stores the picture data of the memory picture. In addition, the frame memory controller 39 supplies the picture data to the DMA controller 41. The DMA controller 41 performs picture processes such as filtering and masking processes for the picture data (digital RGB signal) when necessary. The resultant picture data is supplied to the SCSI protocol controller 42. The SCSI protocol controller 42 sends the picture data that has been processed to the personal computer 7 and/or the digital printer 8 through the SCSI interface.

When the user previews picture data as a memory picture stored in the frame memory 40, the data read from the frame memory 40 is written to the VRAM 34 through the frame memory controller 39 and the VRAM write controller 33. In this case, the frame memory controller 39 averages data in the vertical direction. In addition, the VRAM write controller 33 averages data in the horizontal direction. Thus, the picture data is ¼ averaged. Consequently, the user can preview the picture data stored in the frame memory 40.

The processor CPU 37 communicates with the camera CPU 27 of the camera head portion 11 and receives the vertical synchronous signal –VD therefrom. In addition, the processor CPU 37 receives the vertical synchronous signal –VD from the read timing generating circuit 38. The processor CPU 37 outputs a control signal corresponding to these vertical synchronous signals. The control signal is supplied to the VRAM write controller 33, the VRAM read timing generating circuit 38, the frame memory controller 39, the DMA controller 41, the SCSI protocol controller 42, the background picture memory controller 43, the mix circuit 45, the monitor lookup table 46, and so forth. These circuits are controlled by the processor CPU 37.

Figure 3:
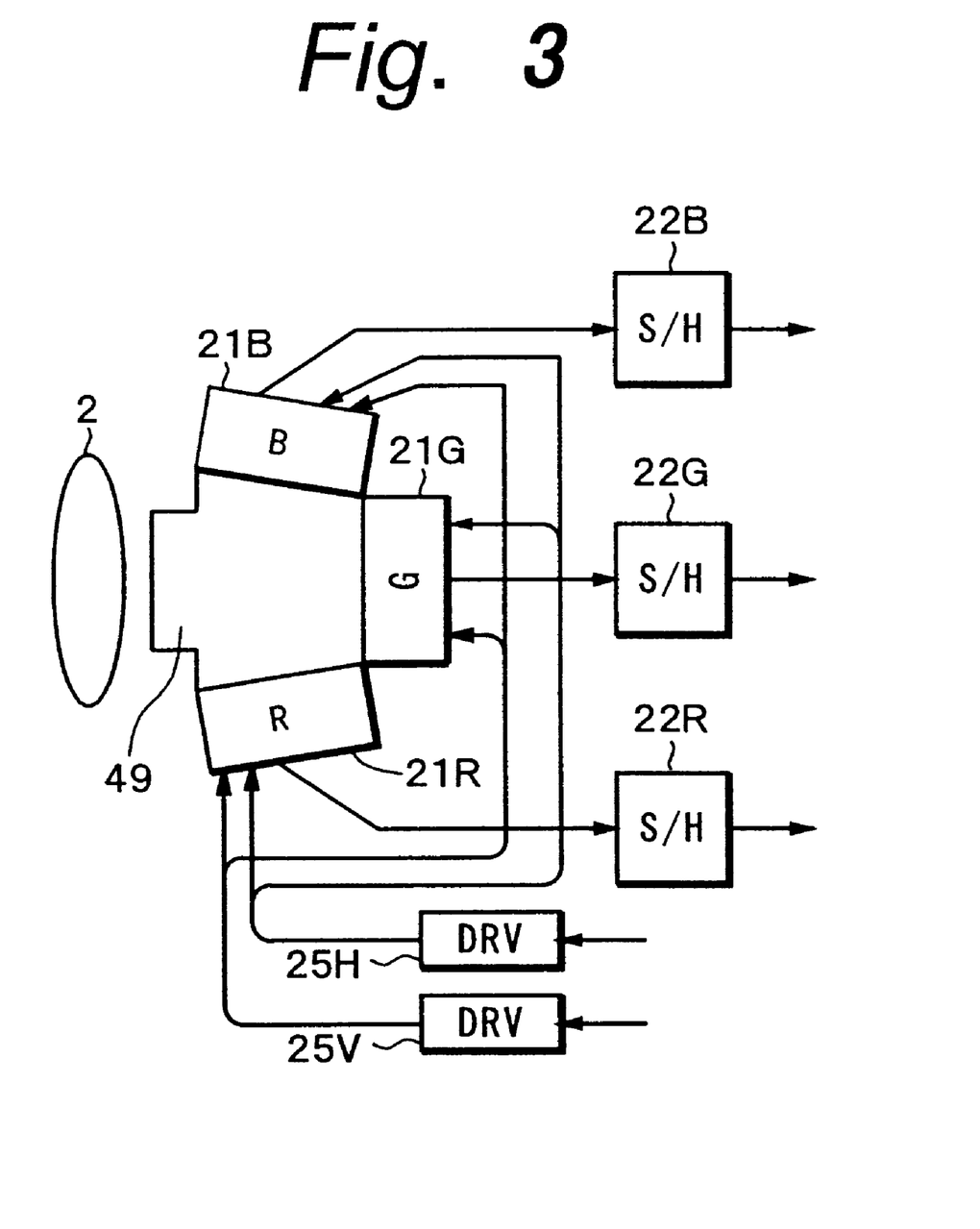
FIG. 3 is a schematic diagram showing a CCD image pickup device according to the present invention.

FIG. 3 shows an example of a CCD image pickup device 21. Light entered through a zoom lens 2 is decomposed into three primary colors by a color decomposing prism 49. The three primary colors emitted from the color decomposing prism 49 are entered into high resolution CCD image pickup devices 21B, 21G, and 21R. Output signals of the high resolution CCD image pickup devices 21B, 21G, and 21R are correlatively double-sampled. Each of the high resolution CCD image pickup devices 21B, 21G, and 21R is structured as for example an inter-line system. A vertical transferring portion is driven corresponding to a vertical transfer pulse received from a vertical CCD driver 25V. Likewise, a horizontal transferring portion is driven corresponding to a horizontal transfer pulse received from a horizontal CCD driver 25H.

Figure 4:
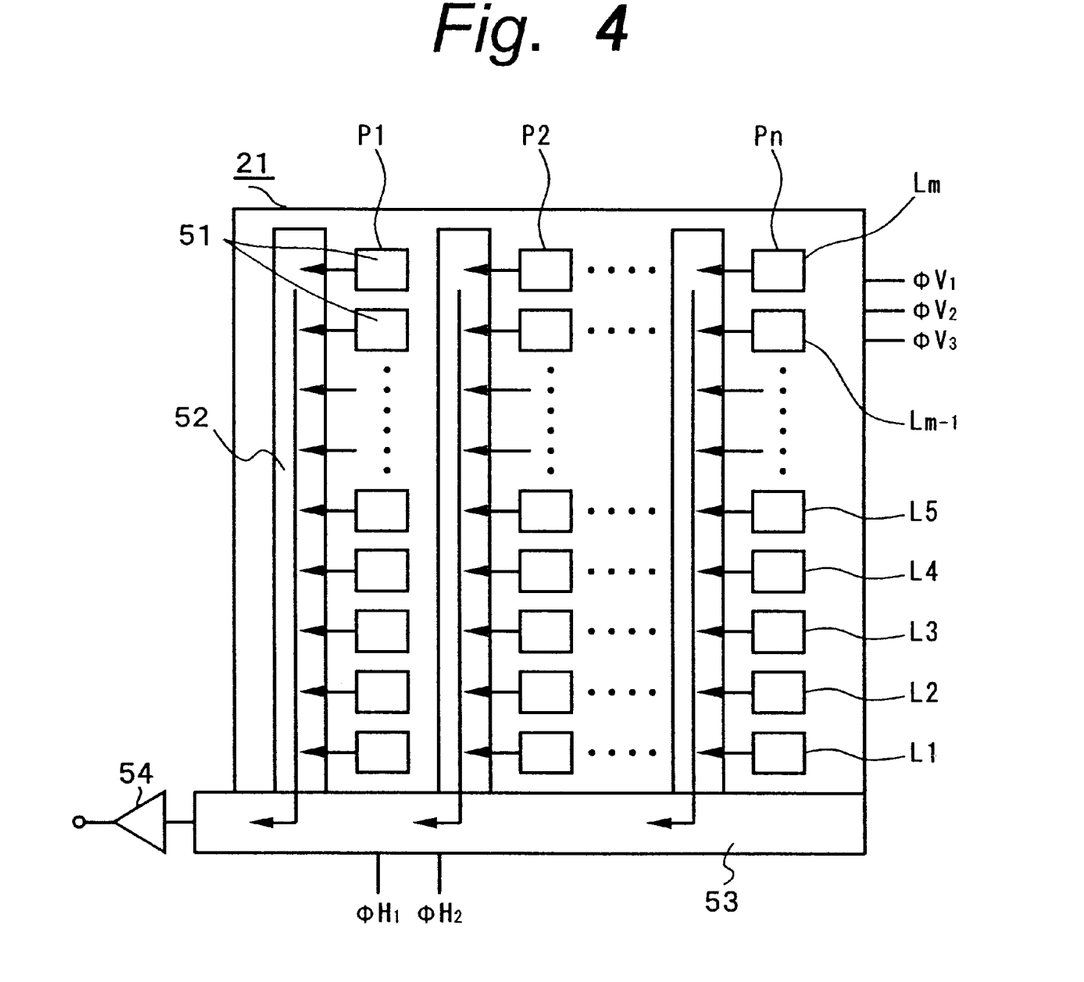
FIG. 4 is a block diagram showing a CCD image pickup device according to the present invention.

FIG. 4 shows a real structure of a CCD image pickup device according to the present invention. The CCD image pickup device shown in FIG. 4 is of for example three-layered three-phase transfer type. As shown in FIG. 4, a photosensitive portion (sensor portion) 51 composed of L1 to Lm sensor members (horizontal) and P1 to Pn sensor members (vertical) is disposed. The photosensitive portions 51 converts light collected through the zoom lens 2 into an electric signal. An electric signal (signal electric charge) received from the photosensitive portion 51 is sent to a horizontal transferring portion 53 through a vertical transferring portion 52. The signal electric charge sent to the horizontal transferring portion 53 is successively output as an output signal of the CCD image pickup device through an amplifier 54. The signal WEN received from the CCD driver 25 is used as a signal for causing the CCD image pickup device to output a signal. The signal –SG is used to send the signal electric charge from the photosensitive portion 51 to the vertical transferring portion 52 and the horizontal transferring portion 53.

Figure 5:
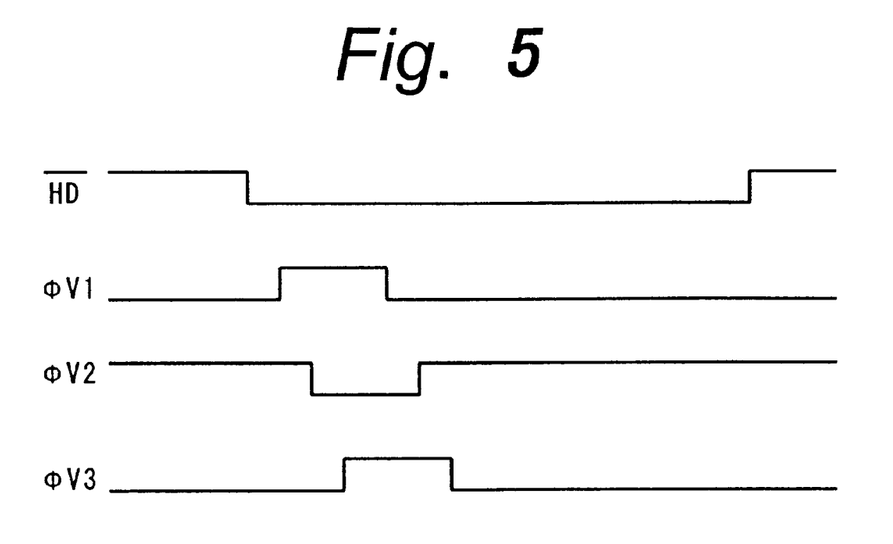
FIG. 5 is a timing chart of signals of the CCD image pickup device according to the present invention.
Figure 6:
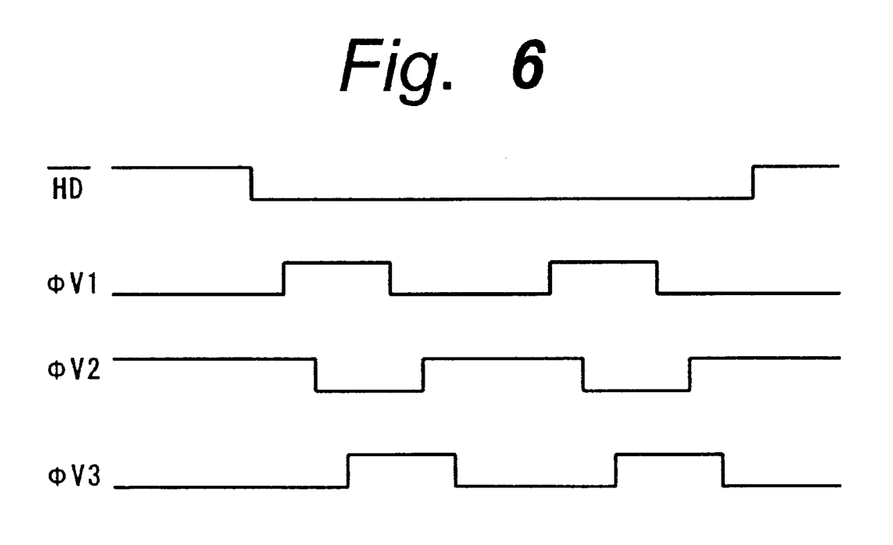
FIG. 6 is a timing chart of signals of the CCD image pickup device according to the present invention.

FIGS. 5 and 6 are timing charts showing signals for a process for driving the CCD image pickup device 21. FIGS. 5 and 6 shows the horizontal synchronous signal –HD and vertical transfer pulses φV1, φV2, and φV3. FIG. 5 shows the timings of the signals in the case that all pixels are read. In a horizontal blanking interval of which the signal level of the signal –HD becomes low, the three vertical transfer pulses φV1, φV2, and φV3 are output once each. FIG. 6 shows the timings of the signals in the double speed read mode. In a horizontal blanking interval of which the signal level of the signal –HD becomes low, three vertical transfer pulses φV1, φV2, and φV3 are output twice each.

In the double speed read mode, the signal electric charge for two lines is sent from the vertical transferring portion 52 in one horizontal blanking interval as shown in the timing chart of FIG. 6. Thus, in the horizontal transferring portion 53, the signal electric charge for two lines is mixed. When the signal level of the signal –HD is high, horizontal transfer pulses φH1 and φH2 (not shown) are output.

Figure 7:
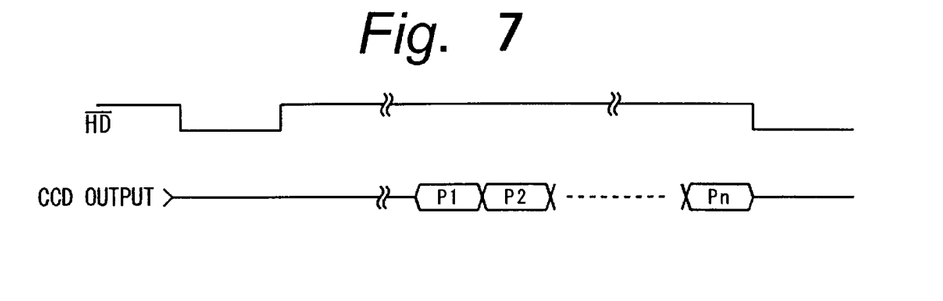
FIG. 7 is a timing chart of a horizontal synchronous signal according to the present invention.

Next, with reference to a timing chart shown in FIG. 7, an embodiment of the present invention will be described. FIG. 7 is a timing chart of the standard read mode corresponding to the horizontal synchronous signal. FIG. 7 shows the horizontal synchronous signal –HD and an output signal of the CCD image pickup device 21. While the signal level of the horizontal synchronous signal is high, signal electric charges of pixels P1, P2, . . . , Pn are output.

Figure 8:
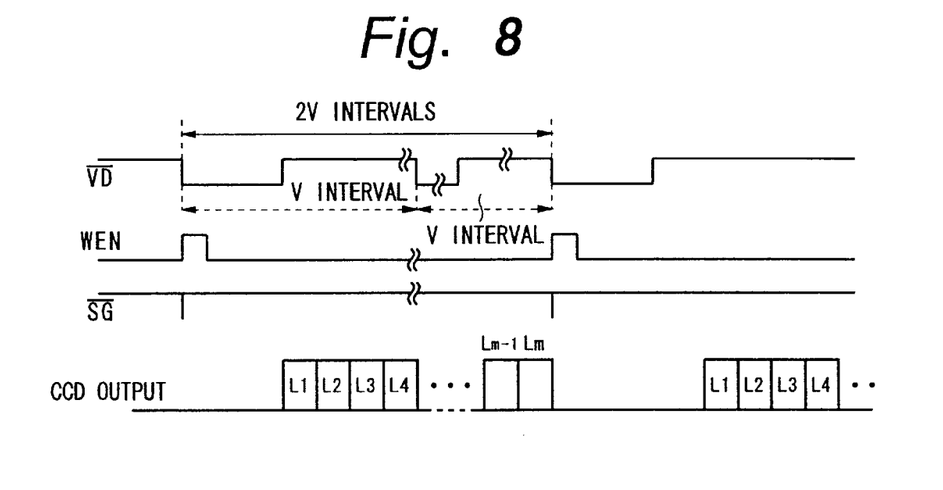
FIG. 8 is a timing chart of a vertical synchronous signal in a standard read mode according to the present invention.

FIG. 8 is a timing chart of the standard read mode corresponding to the vertical synchronous signal. FIG. 8 shows timings of the vertical synchronous signal –VD, control signals WEN and –SG, and the output signal of the CCD image pickup device 21. L1, L2, . . . , Lm each represents a signal electric charge for one line. All pixels are read from the CCD image pickup device 21 in the two intervals of the vertical synchronous signal. Each of the intervals of the vertical synchronous signal is 1/24 seconds. To read all pixels, it takes 1/12 seconds. When the signal level of the vertical synchronous signal becomes low, the signal level of the control signal WEN synchronously becomes high. When the signal level of the signal WEN becomes high, the control signal –SG synchronously becomes low. In synchronization with the control signal –SG, the signal electric charges are supplied from the photosensitive portion 51 to the vertical transferring portion 52. In synchronization with the horizontal synchronous signal –HD, the signal electric charges (not shown) are sent to the horizontal transferring portion 53. As shown in FIG. 7, the signal electric charges are output from the horizontal transferring portion 53 as an output signal of the CCD image pickup device 21.

Figure 9:
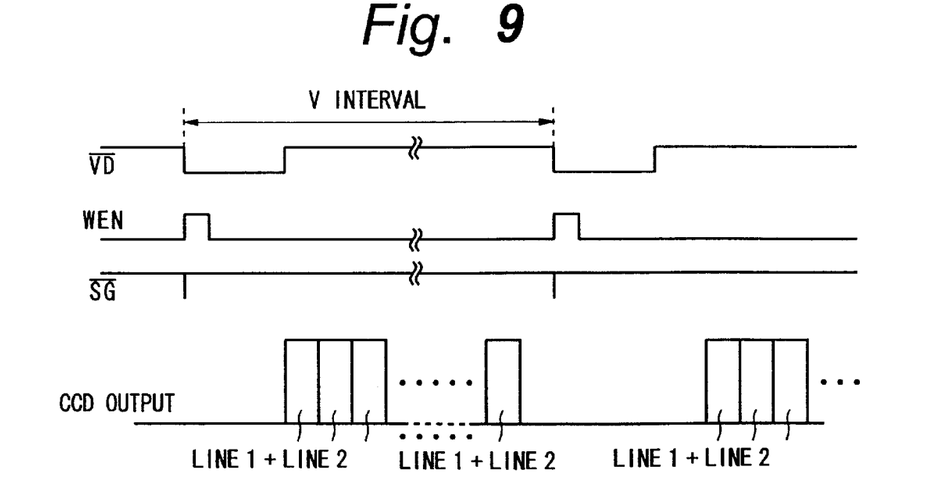
FIG. 9 is a timing chart of a vertical synchronous signal in a double speed read mode according to the present invention.

FIG. 9 is a timing of the double speed read mode corresponding to the vertical synchronous signal. FIG. 9 shows timings of the vertical synchronous signal –VD, the control signals WEN and –SG, and an output signal of the CCD image pickup device 21 in the double speed read mode. In FIG. 9, (L1+L2), (L3+L4), ... (Lm−1+Lm) each represent a signal electric charge for two lines. Each of the intervals of the vertical synchronous signal is 1/24 seconds. In each interval, signal electric charges received from the CCD image pickup device 21 are vertically added and output. When the signal level of the vertical synchronous signal becomes low, the control signal WEN synchronously becomes high. When the signal level of the control signal WEN becomes high, the signal level of the control signal −SG synchronously becomes low. In synchronization with the signal −SG, signal electric charges are sent from the photosensitive portion 51 to the vertical transferring portion 52. The signal electric charge for every two lines are added. In synchronization with the horizontal synchronous signal −HD, the signal electric charge for every two lines is sent to the horizontal transferring portion 53. As shown in FIG. 7, the signal electric charges are supplied as an output signal of the CCD image pickup device 21 from the horizontal transferring portion 53.

When the standard read mode and the double speed read mode are compared, the interval of the output signal supplied from the CCD image pickup device 21 in the double speed read mode is ½ of that in the standard read mode.

Figure 10:
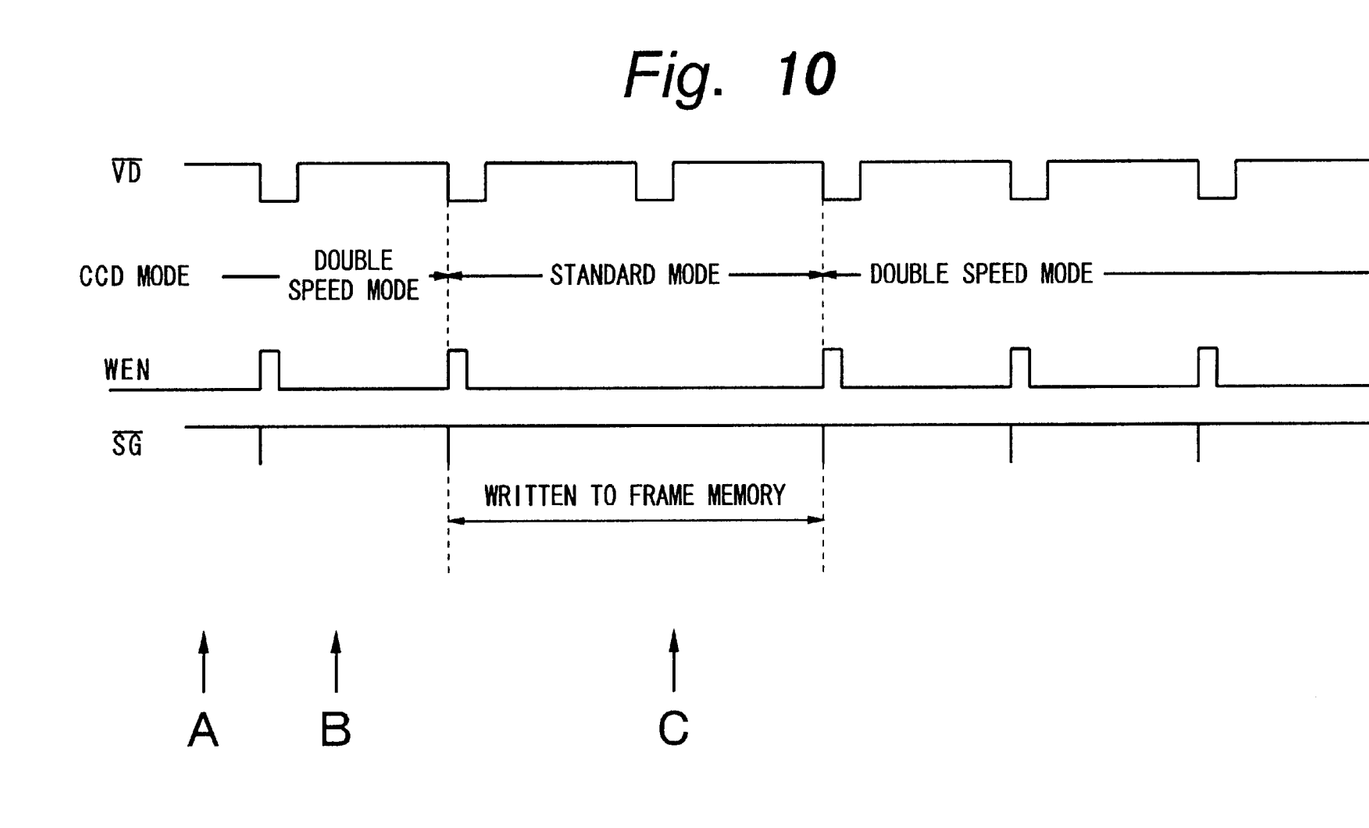
FIG. 10 is a timing chart for explaining a switching operation between the double speed read mode and the standard read mode according to the present invention.

FIG. 10 is a timing chart of the mode switching operation corresponding to the vertical synchronous signal. FIG. 10 shows the vertical synchronous signal −VD, the read mode of the CCD image pickup device 22, and the control signals WEN and −SG. As described above, each of the intervals of the vertical synchronous signal −VD is 1/24 seconds. Normally, the read mode of the CCD image pickup device 21 is designated to the double speed read mode. The signal electric charges are ¼ averaged and written to the RAM 34 of the real time monitor 34. The written picture data is displayed on the live picture/memory picture preview monitor 4. When the signal level of the signal −VD becomes low, the signal level of the control signal WEN synchronously becomes high. When the signal level of the signal WEN becomes high, the signal level of the control signal −SG synchronously becomes low.

For example, at timing A, the grab key is pressed. At the next timing B, the read mode of the CCD image pickup device 21 is changed from the double speed read mode to the standard read mode. At this point, data is prohibited from being written to the VRAM 34. However, data is continuously read from the CCD image pickup device 21. With two intervals of the signal −VD, the standard read mode is started. Thus, all pixels are read. The read pixels are written to the frame memory 40. At the timing C, of which all pixels are read, the read mode of the CCD image pickup device 21 is changed from the standard read mode to the double speed read mode. In addition, data is written to the VRAM 34. After the standard read mode is completed, when the signal level of the signal −VD becomes low, the double speed read mode is started. Thus, the live picture is displayed on the monitor 4. In this case, the memory picture can be displayed instead of the live picture. At this point, write time for writing data from the frame memory 40 to the VRAM 34 is required.

Figure 15:
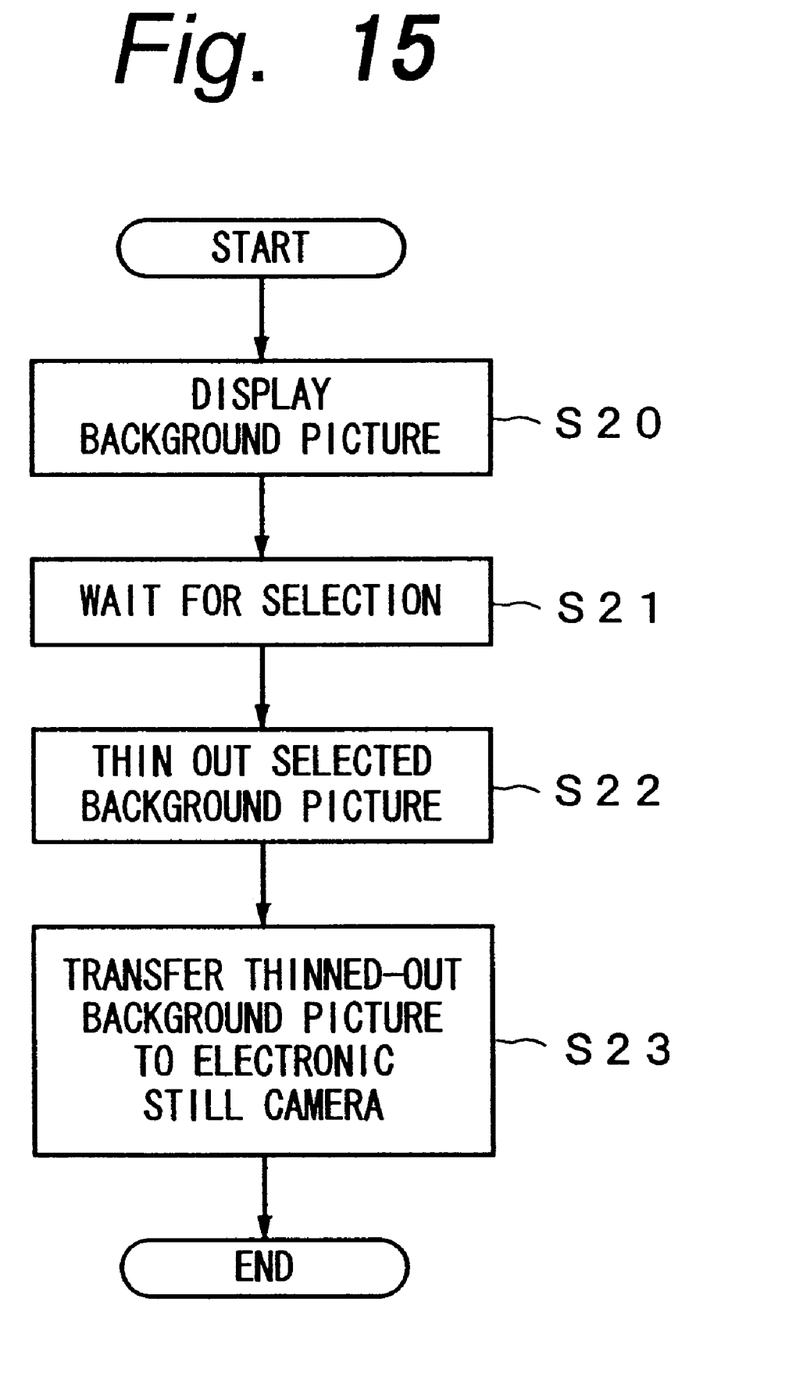
FIG. 15 is a flow chart showing processes of the personal computer according to the present invention.

Next, with reference to a flow chart shown in FIG. 11, a process for mixing picture data and background picture data will be described. This process starts at step Si. At step Si, a background picture is selected on the personal computer 7. With reference to a flow chart shown in FIG. 15, the step S1 will be described. When the user operates a key for selecting a background picture, a process shown in FIG. 15 starts. At step S20, the background picture is read from the storing means and displayed on the monitor 73. When the user clicks the background picture with the mouse 74 or the like, the flow advances to step S22. At step S22, the selected background picture is thinned out. At step S23, the resultant background picture is transferred to the electronic still camera 1 through the interface 72. As a result, the process shown in FIG. 15 is completed.

Figure 11:
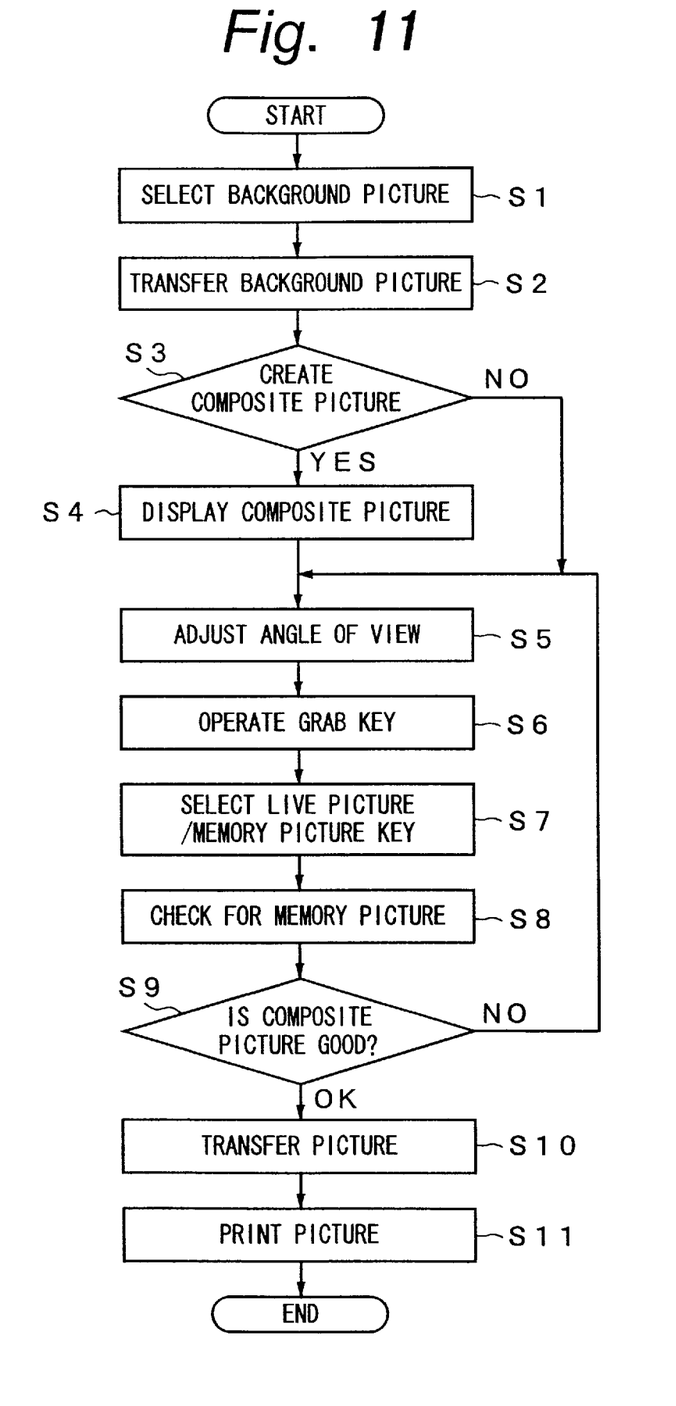
FIG. 11 is a flow chart showing a process for creating composite picture data.

Thereafter, the flow advances to step S2 shown in FIG. 11. The selected background picture data is sent to the background picture memory 44 of the digital electronic still camera 1 through the SCSI protocol controller 42, the DMA controller 41, and the background picture memory controller 43. At step S3, it is determined whether or not the user wants to create a composite picture of the background picture data being transferred and picture data read from the VRAM 34. When the user wants to create the composite picture, he or she presses the composite picture key. When the user presses the composite picture key, the flow advances to step S4. When the user does not want to create the composite picture, the flow advances to step S5. At step S4, the resultant composite picture created by the mix circuit 45 is displayed on the monitor 4. In other words, the background picture is read from the background picture memory 44 corresponding to the control signal received from the processor CPU 37. The mix circuit 45 composites the background picture read from the background picture memory 44 and the picture data received from the VRAM 34.

At step S5, the user adjusts the photographing conditions such as the angle of view and brightness while viewing the composite picture displayed on the monitor 4. At step S6, when the user presses the grab key, the captured picture data is recorded to the frame memory 40 through the camera head portion 11. At step S7, the user presses the live picture/memory picture switch key. Thus, corresponding to the switch position of the live picture/memory picture switch key, the live picture is switched to the memory picture. In other words, the picture written to the frame memory 40 is ¼ averaged. The resultant picture is displayed on the monitor 4 through the VRAM 34 (thus, the user can preview the picture). At step S8, the operator checks for the picture being displayed.

At step S9, the user presses the composite picture key. The user checks for the composite picture of the memory picture and the background picture through the monitor 4. When the user has determined that the composite picture is good, the flow advances to step S10. When the user has determined that the composite picture is no good, the flow advances to step S5. At step S10, the user operates the transfer key of the personal computer 7. Thus, the picture data of the memory picture including the picture data of all pixels written to the frame memory 40 is transferred to the personal computer 7. At step S11, the background picture data and the picture data of all the pixels are composited on the personal computer 7. The resultant composite picture is printed by the digital printer 8. As a result, the process of the flow chart shown in FIG. 11 is completed.

In the embodiment, the number of pixels in the standard read mode for reading all pixels from the CCD image pickup device is the half of that in the double speed read mode in each of the horizontal and vertical directions. However, the ratio of pixels of the standard read mode and pixels of the high speed read mode may be ⅓ or ¼. In addition, as a solid state image pickup device, not only the three-plate type, but a two-plate type of which pixels are spatially deviated by ½ pitches in the horizontal and vertical directions may be used.

According to the present invention, it takes approximately 1/12 seconds to read one picture. For example, with a CCD image pickup device that can read effective pixels of (1024× 1279), since the sampling grade is changed, a composite picture of a captured picture and a background picture can be checked on a monitor. At this point, the background picture can be freely selected on an external computer.

According to the present invention, for example, when the angle of view is adjusted, it is not necessary to send captured picture data from the digital still camera to the external computer. Thus, the process time for the photographing, mixing, and printing processes can be reduced.

In addition, according to the present invention, the user can select a suitable background picture from many alternatives.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. An image pickup system, comprising:
   an image pickup apparatus including:
      image pickup means having a first imaging mode and a second imaging mode, in the first imaging mode, a first captured picture signal, in the second imaging mode a second captured picture signal being output, the number of pixels of the first captured picture signal being larger than the number of pixels of the second captured picture signal,
      first storing means having a storage capacity for storing the first captured picture signal,
      second storing means to which an external input picture signal supplied from outside the apparatus is written, the number of pixels of the external input picture signal being nearly the same as the number of pixels of the second captured picture signal,
      mixing means for mixing the second captured picture signal received from said image pickup means in the second imaging mode and the external input picture signal read from said second storing means,
      displaying means for displaying a picture corresponding to a picture signal received from said mixing means, the number of pixels of the picture signal is the same as that of the second captured picture signal,
      commanding means for causing a still picture to be captured, and
      controlling means for controlling said image pickup means, said first storing means, and said second storing means,
      wherein said controlling means causes said image pickup means to operate in the first imaging mode so as to cause said displaying means to display the picture received from said mixing means, and thereby causes the mode of said image pickup means to be switched to the second imaging mode, and causes said first storing means to record the first captured picture signal when said commanding means causes the still picture to be captured; and
   a controlling unit including:
      storing means for storing a first picture signal, the number of pixels of the first picture signal being the same as that of the first captured picture signal,
      thin-out means for thinning out pixels of the first picture signal as a second picture signal, and
      transferring means for transferring the second picture signal as the external input picture signal to said image pickup apparatus.

2. The image pickup system as set forth in claim 1, wherein said image pickup means includes:
   an image pickup device for outputting the first captured picture signal in the first imaging mode and outputting the second captured picture signal in the second imaging mode, the number of pixels in the vertical direction of the second captured picture signal in the second imaging mode is smaller than that of the first captured picture signal in the first imaging mode; and
   pixel number converting means for outputting the first captured picture signal that is received from said image pickup device to said first storing means without converting the number of pixels in the first imaging mode and for thinning out pixels in the horizontal direction of the captured picture signal received from said image pickup device.

3. The image pickup system as set forth in claim 2, wherein said pixel number converting means is composed of storing means for temporarily storing all pixels of the captured picture signal received from said image pickup device in the first and second imaging modes, reading all pixels in the first imaging mode, and thinning out pixels in the horizontal direction and reading the second captured picture signal in the second imaging mode.

4. The image pickup system as set forth in claim 2, said image pickup apparatus further comprising:
   interface means that can be connected to an external controlling unit,
   wherein the external input picture signal is supplied to said second storing means through said interface means, the first captured picture signal read from said first storing means being sent to the external controlling unit through said interface means.

* * * * *